United States Patent
Hawkins et al.

(10) Patent No.: US 7,572,306 B2
(45) Date of Patent: Aug. 11, 2009

(54) FILTER SYSTEM INTEGRATING PRESSURE REGULATION AND AIR VENT

(75) Inventors: Charles W. Hawkins, Sparta, TN (US); Mark T. Wieczorek, Cookeville, TN (US); Clinton T. DeWeese, Cookeville, TN (US); Ricky England, Sparta, TN (US)

(73) Assignee: Cummins Filtration IP Inc., Minneapolis, MN (US)

( * ) Notice: Subject to any disclaimer, the term of this patent is extended or adjusted under 35 U.S.C. 154(b) by 171 days.

(21) Appl. No.: 11/226,152

(22) Filed: Sep. 14, 2005

(65) Prior Publication Data

US 2006/0053756 A1    Mar. 16, 2006

Related U.S. Application Data

(60) Provisional application No. 60/610,034, filed on Sep. 15, 2004.

(51) Int. Cl.
*B01D 46/00*    (2006.01)
*B01D 35/00*    (2006.01)
*B01D 27/00*    (2006.01)
*B01D 19/00*    (2006.01)

(52) U.S. Cl. .................. 55/310; 210/188; 210/436; 210/438

(58) Field of Classification Search .......... 210/436, 210/188, 438; 55/310
See application file for complete search history.

(56) References Cited

U.S. PATENT DOCUMENTS

| | | | | |
|---|---|---|---|---|
| 2,187,514 A | * | 1/1940 | Gardner | 73/61.71 |
| 3,384,242 A | * | 5/1968 | Niccum et al. | 210/436 |
| 4,976,852 A | * | 12/1990 | Janik et al. | 210/86 |
| 5,928,511 A | * | 7/1999 | Messner et al. | 210/248 |
| 6,000,674 A | * | 12/1999 | Cheng | 251/26 |
| 6,015,492 A | * | 1/2000 | Popoff et al. | 210/238 |
| 6,113,781 A | * | 9/2000 | Popoff et al. | 210/234 |
| 6,270,659 B1 | * | 8/2001 | Bagci et al. | 210/111 |
| 6,607,665 B2 | * | 8/2003 | Fick et al. | 210/238 |
| 6,955,754 B2 | * | 10/2005 | de Sylva | 210/120 |
| 6,988,625 B2 | * | 1/2006 | Thomas et al. | 210/437 |

FOREIGN PATENT DOCUMENTS

| | | |
|---|---|---|
| JP | S58-196810 A | 11/1983 |
| JP | H09-206515 A | 8/1997 |
| JP | H11-019415 A | 1/1999 |
| JP | 2000-225305 A | 8/2000 |

* cited by examiner

*Primary Examiner*—Walter D Griffin
*Assistant Examiner*—Amber Orlando
(74) *Attorney, Agent, or Firm*—Hamre, Schumann, Mueller & Larson, P.C.; J. Bruce Schelkopf

(57) ABSTRACT

A filter system includes a filter configured to regulate fuel pressure as well as automatically vent air from the filter. A pressure regulator valve is positioned in the top of a standpipe of the filter. The filter includes a filter cartridge with top and bottom end caps. The top end cap of the filter cartridge has a hole with radial sealing gasket, which seals against the top of the standpipe to prohibit flow from bypassing the filter cartridge. This arrangement exposes the regulator valve to the fuel and/or air at the top of the filter housing. Pressure in the housing opens the valve, allowing air and/or fuel to be vented through the standpipe, and back to the fuel tank.

20 Claims, 10 Drawing Sheets

FILTER SYSTEM INTEGRATING PRESSURE REGULATION AND AIR VENT

REFERENCE TO RELATED APPLICATIONS

The present application claims the benefit of U.S. Provisional Application No. 60/610,034, filed Sep. 15, 2004, which is hereby incorporated by reference in its entirety.

BACKGROUND

The present invention generally relates to filtering systems and more specifically, but not exclusively, concerns a filter that automatically vents air.

Filtering systems are used in a wide range of applications, such as for filtering fluids like oil and fuel for engines. Fuel filters are used to filter particulate matter as well as other contaminants from fuel so as to increase engine life and performance. During routine operation, air can be introduced into the fuel system, which can be detrimental to engine performance. Many fuel systems require that air be purged from the system for proper operation. The pressure of the fuel also needs to be regulated to ensure optimum fuel pump and/or injector performance. Some venting systems have been proposed to purge air from the fuel system, but most of these systems require extensive fuel system modifications, which can be quite costly, and/or require the operator to manually purge the air, which can be quite cumbersome.

Thus, there is a need for improvement in this field.

SUMMARY

One aspect concerns a filter system that includes a filter configured to regulate fuel pressure as well as automatically vent air from the filter. A pressure regulator valve is positioned in the top of a standpipe of the filter. The filter includes a filter cartridge with top and bottom end caps. The top end cap of the filter cartridge has a hole with radial sealing gasket, which seals against the top of the standpipe to prohibit flow from bypassing the filter cartridge. This arrangement exposes the regulator valve to the fuel and/or air at the top of the filter housing. Pressure in the housing opens the valve, allowing air and/or fuel to be vented through the standpipe, and back to the fuel tank.

Further forms, objects, features, aspects, benefits, advantages, and embodiments of the present invention will become apparent from a detailed description and drawings provided herewith.

DESCRIPTION OF SELECTED EMBODIMENTS

Figure 1:
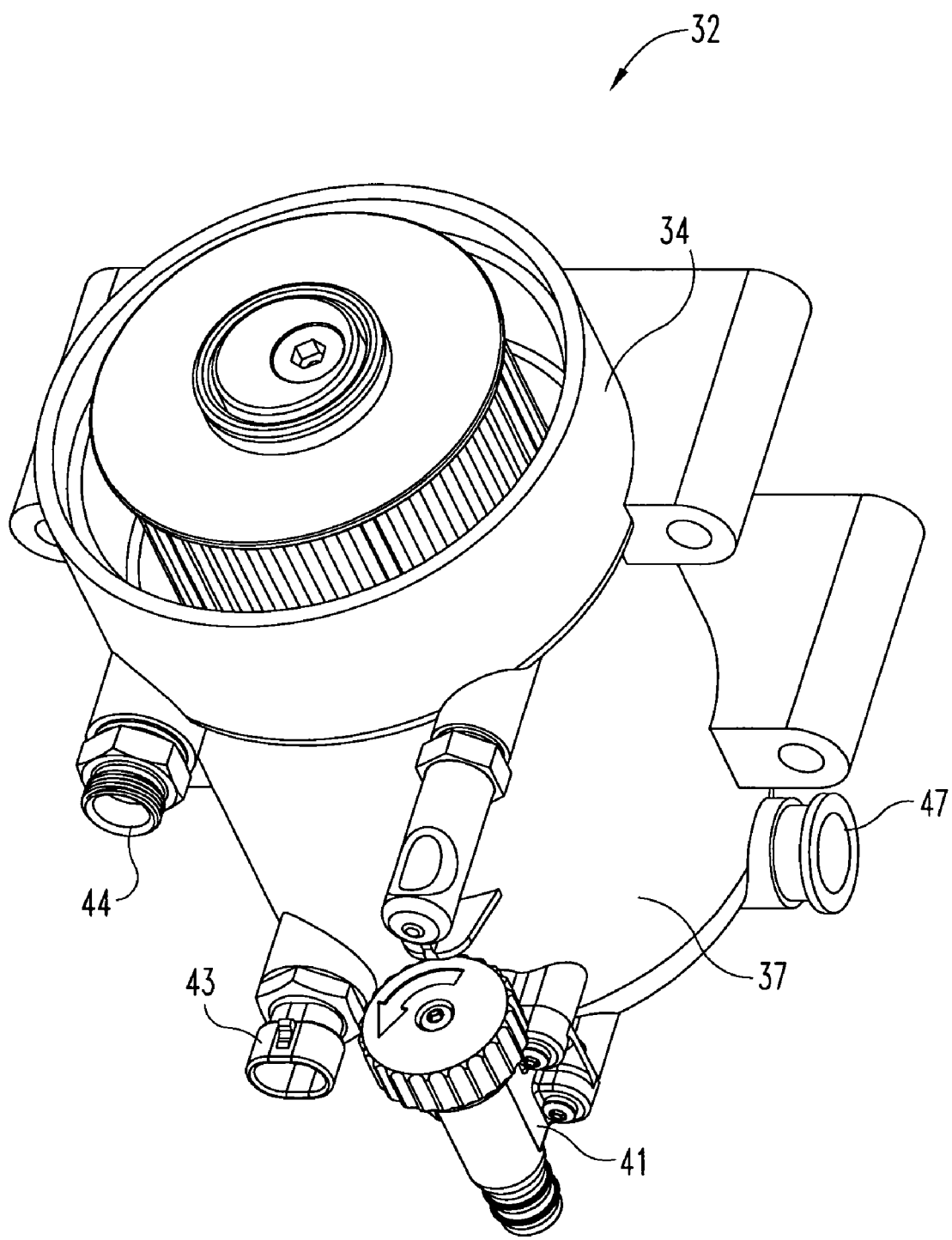
FIG. 1 is a perspective view of a filter system according to one embodiment.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Figure 2:
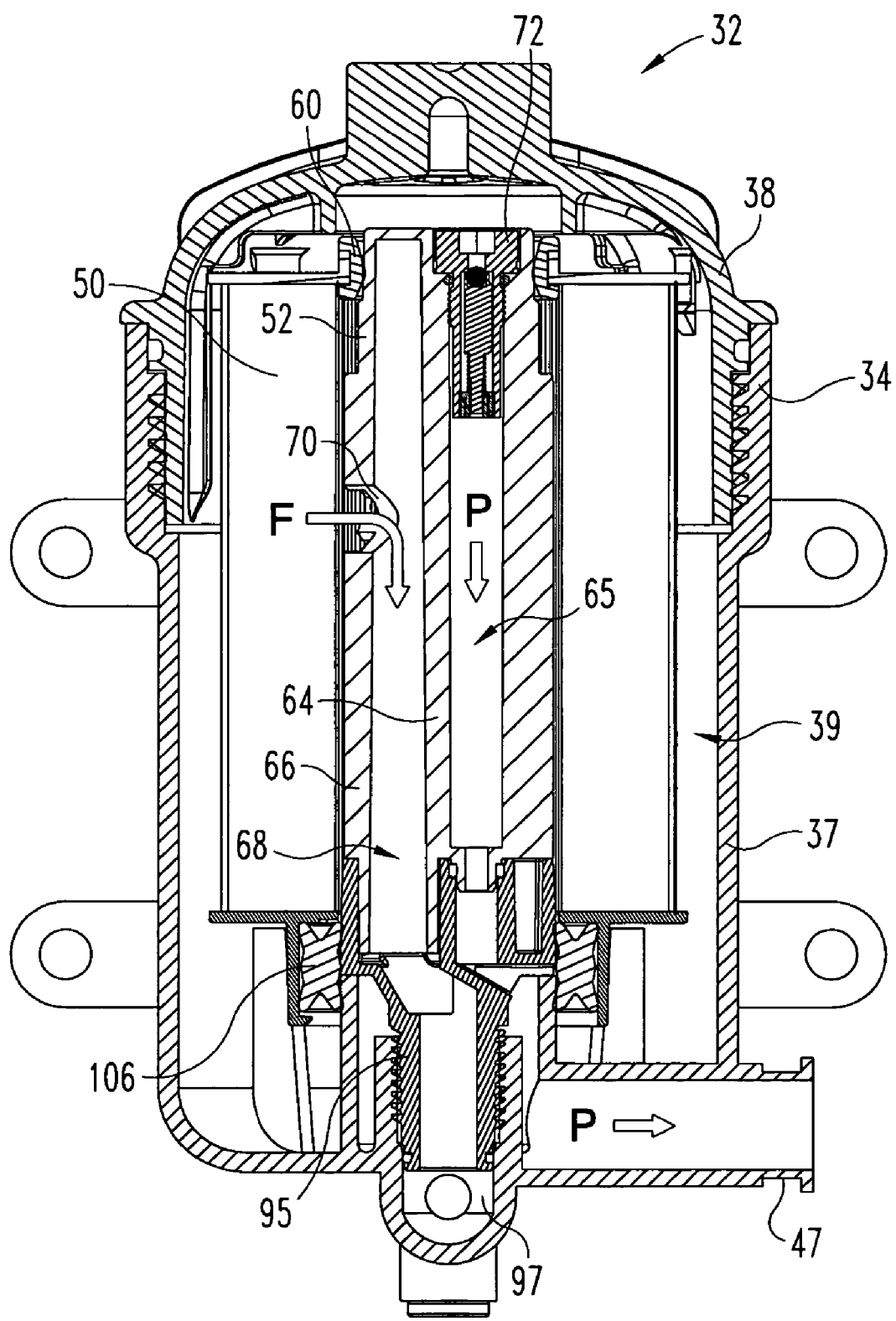
FIG. 2 is a first cross sectional view of a filter used in the FIG. 1 system.
Figure 3:
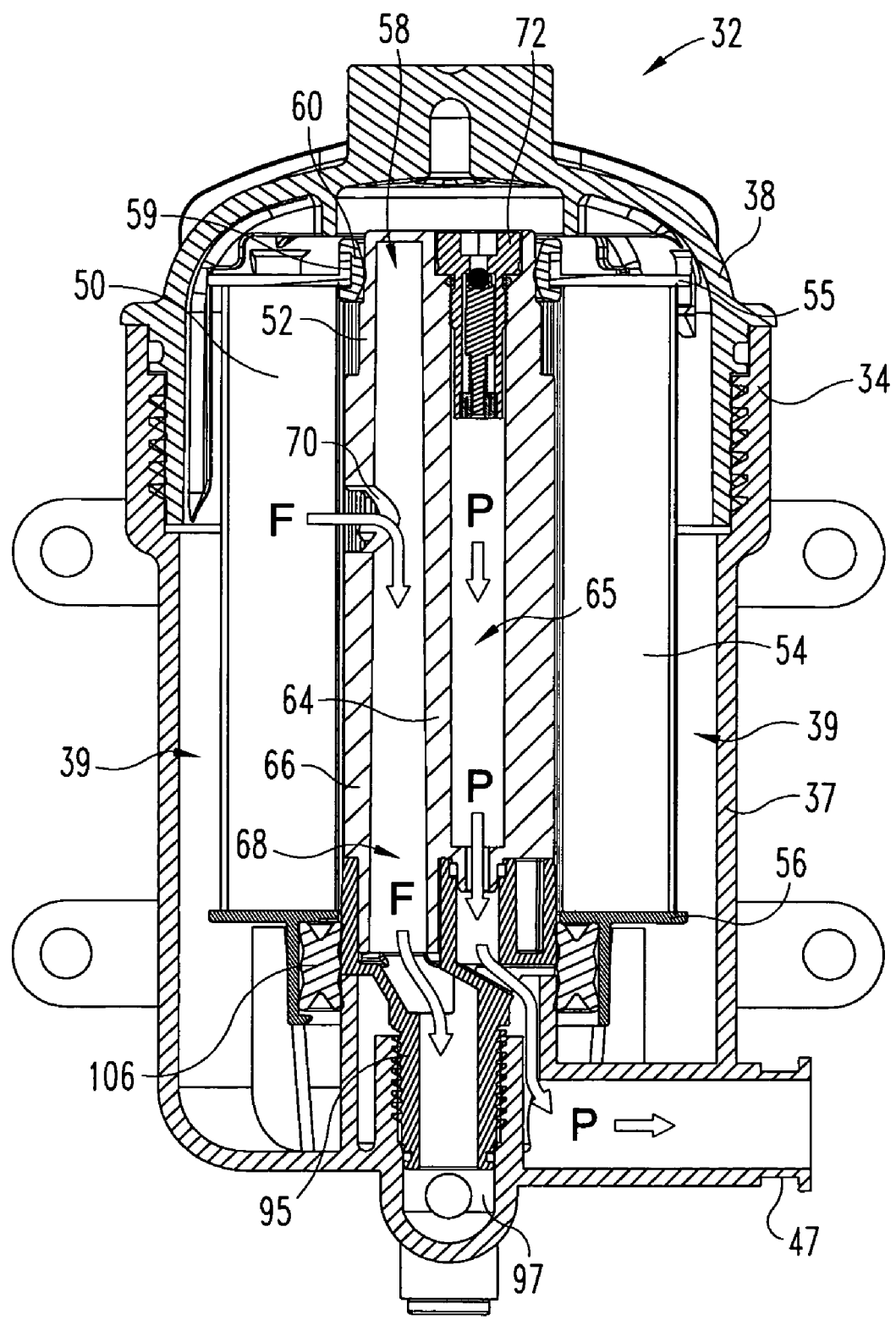
FIG. 3 is a second cross sectional view of the FIG. 2 filter.

A filter system 32 that includes a fuel filter 34 according to one embodiment, among many, is illustrated in FIGS. 1 and 2, and an enlarged cross-sectional view of the fuel filter 34 is shown in FIG. 3. Although the illustrated embodiment will be described with reference to a fuel filter system, it should be recognized that features from the system 32 can be adapted for use in other types of environments and for other kinds of fluids. As depicted, the fuel filter 34 includes a filter housing 37 with a cap 38 threadedly secured to the housing 37 so as to define a filter cavity 39. Referring again to FIG. 1, the filter 34 includes a water drain valve 41 from which water is drained from the filter cavity 39 and a fuel/water sensor 43. The housing 37 further defines a fuel inlet port 44 through which unfiltered fuel is supplied to the fuel filter 34 and a bleed or drain port 47 from where excess fuel and/or air are bled back into the fuel tank. As mentioned before, many fuel systems require that air be purged from the system, for proper operation, and pressure regulation is required for optimum pump and injector performance. In one embodiment, the fuel filter 34 is located near the highest point in some fuel systems, and is thus the ideal location to purge air.

Figure 4:
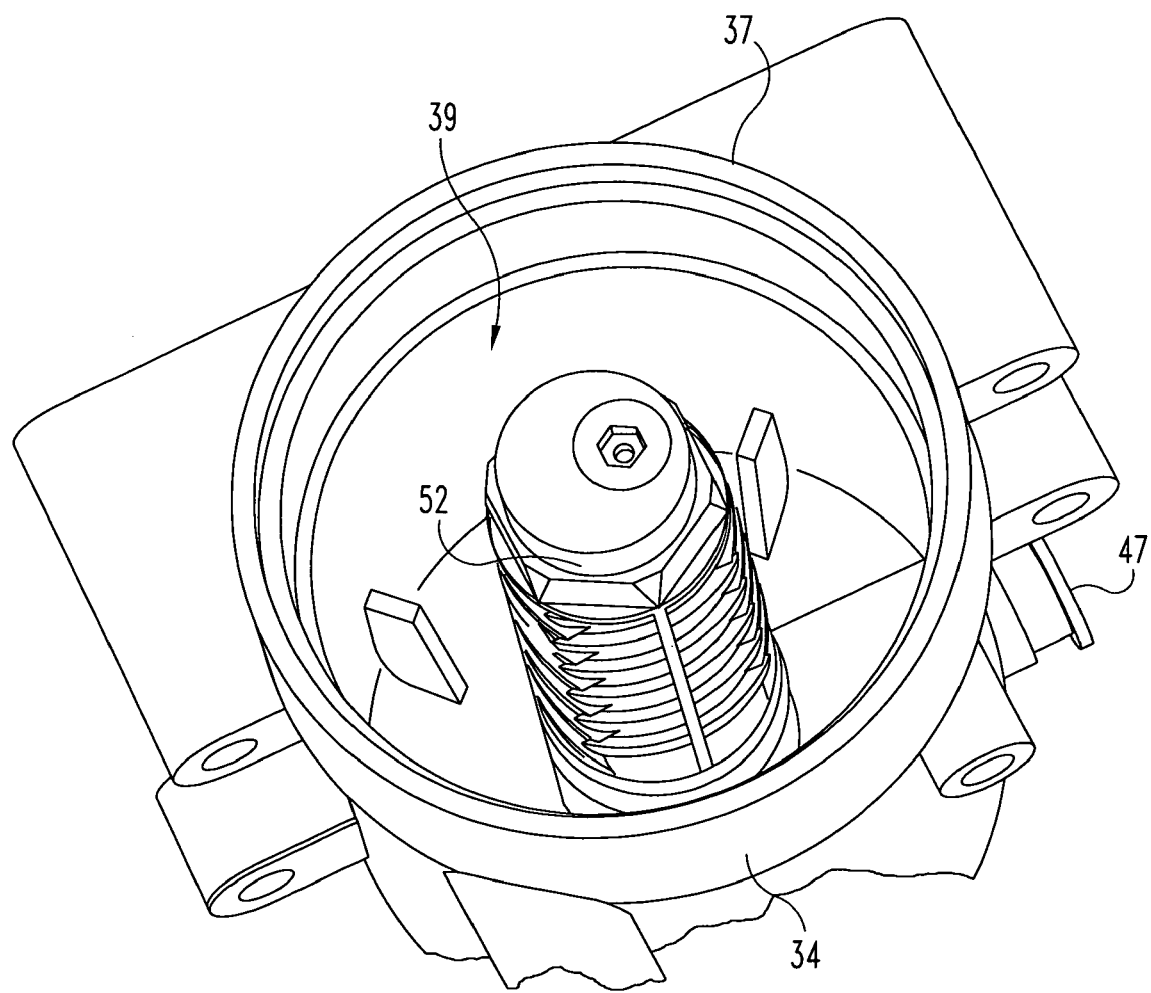
FIG. 4 is a perspective view of a housing for the FIG. 3 filter.
Figure 5:
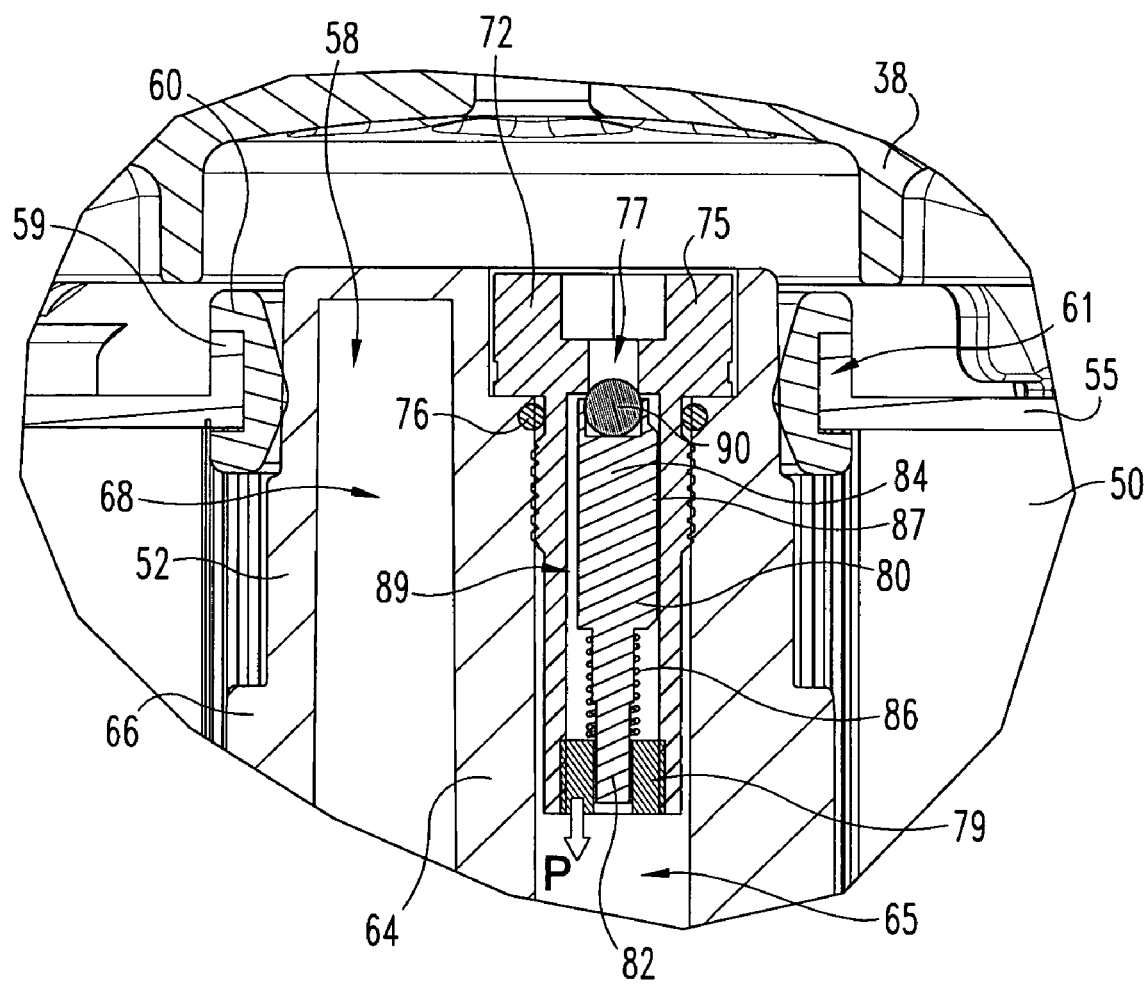
FIG. 5 is an enlarged cross sectional view of a top portion of the FIG. 3 filter.

Inside the filter cavity 39, the fuel filter 34 includes a filter cartridge 50 for filtering the fuel that is received around a standpipe 52, as is depicted in FIGS. 3 and 4. The filter cartridge 50 has a filter element or media 54 for filtering the fuel sandwiched between top (first) 55 and bottom 56 (second) endplates or end caps. The filter element 54 can include filter media of the type generally known to those skilled in the art. In the illustrated embodiment, the filter cartridge 50 as well as other components of the filter 34 are generally cylindrical in shape, but it should be appreciated that these components can be shaped differently in other embodiments. With reference to FIG. 5, the top end cap 55 of the cartridge 50 defines a standpipe opening 58 in which a top portion of the standpipe 52 is received. Around the standpipe opening 58, the top end cap 55 has a seal retention flange 59 that retains an upper standpipe seal 60. The upper standpipe seal 60 forms a seal between the standpipe 52 and the top end cap 55, thereby minimizing the risk of fuel bypassing the filter element 54. As shown, the upper standpipe seal 60 is a radial type seal and has an outer radial notch 61 that receives the seal retention flange 59. However, it is contemplated that the upper standpipe seal 60 can be shaped differently in other embodiments or eliminated altogether. In an alternate embodiment, instead using the retaining flange 59, the seal 60 is located on the standpipe 52. In this particular embodiment, a seal, such as an o-ring seal, is installed on the standpipe 52, and then the seal interfaces with the top end cap 55. As should be appreciated, many different other types of seal geometries can be used.

In the illustrated embodiment, the standpipe 52 has inner standpipe member or tube 64 that defines an inner purge or drain passage 65 and an outer standpipe member or tube 66 that defines an outer filter flow passage 68. In the illustrated embodiment, the inner 65 and outer 68 flow passages are oriented in a side-by-side relationship, but it should be recognized that the passages 65, 68 as well as the tubes 64, 66 can be oriented differently in other embodiments. Looking again at FIGS. 2 and 3, the outer standpipe tube 66 defines one or more flow openings 70 through which the filtered fuel flows into the outer flow passage 68, as is indicated by arrow F. At the top end, the standpipe 52 in FIG. 5 has a pressure regulation valve 72 that regulates the fuel pressure in the system 32. Although the illustrated embodiment will described with reference to a pressure regulation valve, it should be understood that other types of valves can be used, such as check valves, bypass valves, and thermostatic valves, to name a few examples. The pressure regulation valve 72 has a predetermined cracking pressure at which the valve 72 opens in order to relieve fuel pressure. When opened, the valve 72 also allows air trapped at the top of the filter 34 to be vented back into the fuel tank. Although in the illustrated embodiment the valve 72 is positioned at the end of the standpipe 52, it is envisioned that the valve 72 in other embodiments can be recessed inside the standpipe 52. The pressure regulation valve 72 has a valve body 75 that is threadedly secured inside the inner flow passage 65, and a seal 76 is disposed between the valve body 75 and the inner standpipe member 64 so as to minimize the chance of fuel and/or air leakage around the valve 72. Nonetheless, it should be appreciated that the valve 72 can be secured and sealed in other manners. For example, in another embodiment, the seal 76 is eliminated because any resulting fuel leakage would return the leaked fuel back to the fuel tank and any air leakage might actually improve the air venting performance. The valve body 75 defines a valve opening 77 at one end, and at the other end, the valve 72 has a spring retainer 79 configured to allow fuel and/or air flow. In the illustrated embodiment, the spring retainer 79 is rectangular in shape such that the retainer 79 contacts the valve body 75 at two locations. By the retainer 79 being rectangular in shape, gaps are formed between the retainer 79 and the valve body 75 through which the fuel and/or air flows. It should be recognized that the spring retainer 79 can be shaped differently in other embodiments.

Between the valve opening 77 and the spring retainer 79, the valve 72 has a valve member 80 that is configured to slide and seal the valve opening 77. As shown, the valve member 80 includes a stem 82 that slides within the spring retainer 79 and a head portion 84 that is larger than the head 84. Wrapped around the stem 82, between the spring retainer 79 and the head 84, the valve 72 has a spring 86 that biases the valve member 80 to a position that seals the valve opening 77. The stiffness of the spring 86 is selected based on the desired cracking pressure for the valve 72. Once the desired cracking pressure is reached, the valve 72 opens, thereby relieving the fuel pressure and venting any air trapped at the top of the filter 34. In the illustrated embodiment, the spring 86 is a coil spring, but it is contemplated that the valve 72 in other embodiments can include other means for biasing the valve member 80. The head 84 includes a series of radially extending fins 87 that define flow notches 89 through which the purged fuel and/or air flows when the valve 72 is opened, as is indicated by arrow P. At the end that faces the valve opening 77, the valve member 80 has a seal member 90 that is configured to seal the valve opening 77. The seal member 90 in the embodiment shown is a metal ball, but the seal member 90 can include other types of sealing structures. Moreover, it is envisioned that the valve 72 in other embodiments can include other types of pressure regulator valves, such as diaphragm type valves.

Figure 6:
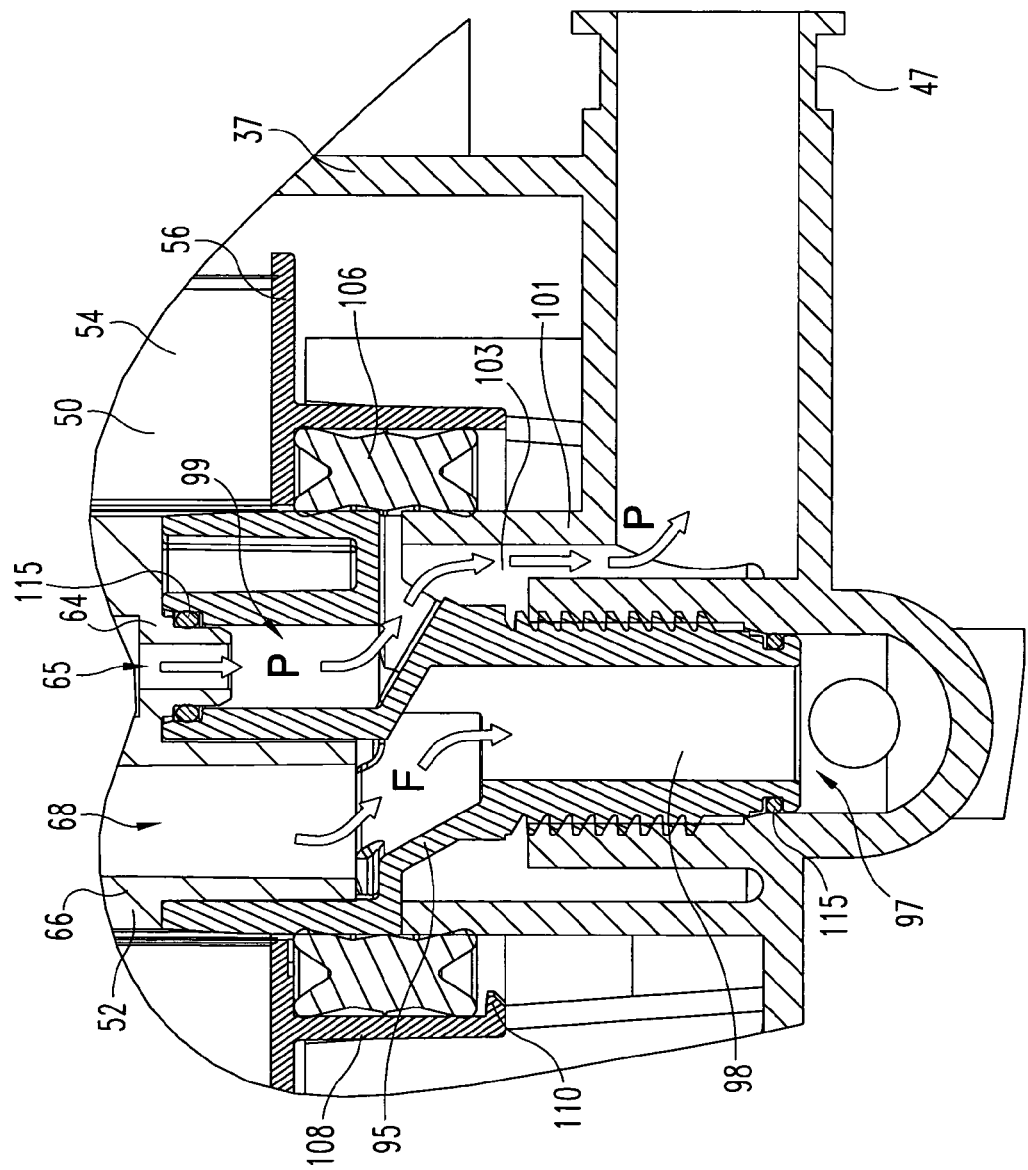
FIG. 6 is an enlarged cross sectional view of a bottom portion of the FIG. 3 filter.

At the base of the housing 37, as illustrated in FIG. 6, the filter 34 has an adapter 95 that couples the standpipe 52 to the housing 37. In the illustrated embodiment, the adapter 95 is threadedly secured to a filter fuel discharge port 97 in the housing 37 that supplies the filtered fuel to the engine. However, it should be understood that the adapter 95 can be secured in other ways. For example, the adapter 95 can be integrally formed with the housing 37 in other embodiments. In FIG. 6, the adapter 95 defines a filtered fuel passage 98 that provides a passageway for the filtered fuel F to flow from the outer flow passage 68 of the standpipe 52 to the discharge port 97 in the housing 37. The adapter 95 further defines a pressure release passage 99 through which purged fuel and/or air travels from the inner flow passage 65 of the standpipe 52 to the drain port 47 in the housing 37. As mentioned before, the purged air and/or fuel from the drain port 47 is then discharged to the fuel tank. The housing 37 further has a flange 101 that, along with the adapter 95, defines a flow cavity 103 where the purged fuel and/or air flows to the drain port 47, as is shown by arrow P. Around the flow cavity 103, the interface between the adapter 95, the cartridge 50, and the housing 37 is sealed with a double gasket 106. In the illustrated embodiment, the bottom end cap 56 has a gasket retention flange 108 with a hook 110 that holds the gasket 106 in position. As should be recognized, the double gasket 106 prevents the fuel from bypassing the filter cartridge 50. In another embodiment where the standpipe 52 is sealed directly to the housing 37, a single contact gasket, like an o-ring seal, is disposed between the bottom end cap 56 and the standpipe 52 (or the housing 37). In still yet another form, the standpipe 52 is fitted with a gasket that is located between the filter cartridge 50 and the standpipe 52. Referring once more to the embodiment in FIG. 6, o-ring seals 115 are used to seal the adapter 95 with the housing 37 as well as the standpipe 52 to the adapter 95, thereby minimizing leakage into the various flow paths. It should be understood that these components can be sealed in other manners.

During operation, the unfiltered fuel flows into the filter cavity 39 via the fuel inlet port 44 (FIG. 1). From the filter cavity 39, the fuel is filtered by the filter cartridge 50 and flows into the outer flow passage 68 in the standpipe 52 via the flow openings 70, as shown by arrows F in FIGS. 2 and 3. The filtered fluid F then travels through the standpipe 52 and is discharged to the engine or other engine components via the discharge port 97. When the pressure of the fuel in the filter 34 exceeds the cracking pressure of the valve 72, the valve 72 opens to relieve the excess pressure. Any air or other gas trapped near the top of the filter 34 is discharged through the valve along with some of the fuel, as shown by arrows P. The purged fuel and/or air travels through the inner flow passage 65 of the standpipe 52 and is discharged to the fuel tank via the drain port 47.

Figure 7:
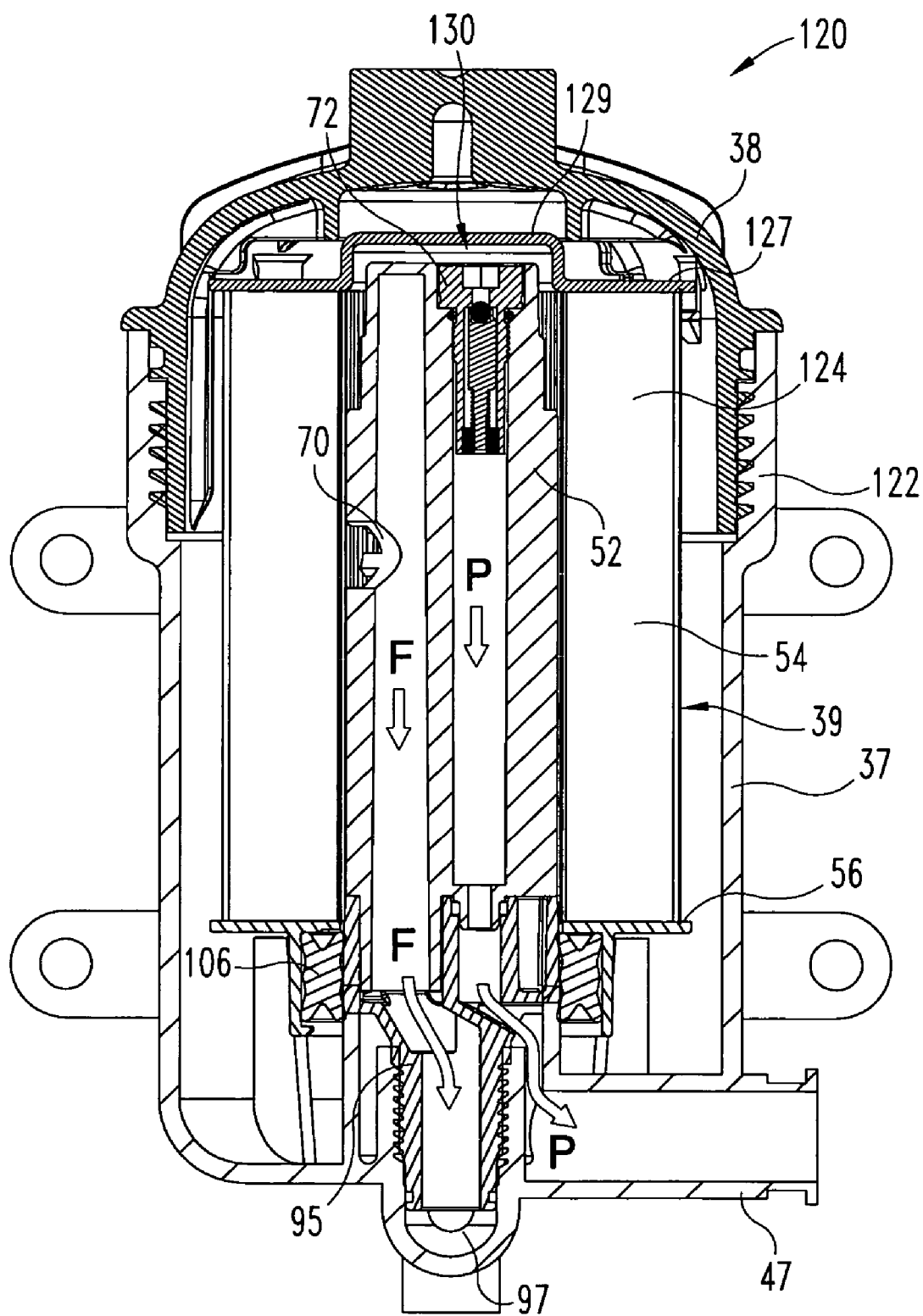
FIG. 7 is a cross sectional view of a filter system according to another embodiment.

In the filter system 32 described above, unfiltered fuel was purged by the pressure regulator valve 72 in order to regulate the pressure of the fuel. In another embodiment, which is illustrated in FIG. 7, a filter system 120 with a fuel filter 122 regulates fuel pressure by purging filtered fuel. The fuel filter 122 in FIG. 7 shares a number of features in common with the filter 34 described above, and for the sake of clarity as well as brevity, these common features will not be described again in great detail below. The one notable distinguishing feature of the fuel filter 122 in FIG. 7 concerns its filter cartridge 124. Like the filter cartridge 50 of FIG. 3, the filter cartridge 124 in the FIG. 7 embodiment has filter element 54 that is sandwiched between the bottom end cap 56 and a top end cap 127. Instead of having the standpipe opening 58 with the standpipe seal 60 sealing against the standpipe 52, the top end cap 127 in FIG. 7 is solid, and the top end cap 127 has a dimpled portion 129 that is spaced away from the standpipe 52 to form a flow gap 130. Filtered fuel (as well as air) flows in the flow gap 130 and through the valve 72 when high pressure conditions occur so as to regulate the fuel pressure and eliminate air from the fuel. To maintain the spacing of the flow gap 130 and prevent choking of the fuel flow, the filter housing 37 in one embodiment has a series of ribs that support the bottom end cap 56 so as to prevent the top end cap 127 from getting to close to the standpipe 52. The dimpled portion 129 in still yet another embodiment has one or more ribs for spacing the top end cap 127 from the standpipe 52. As should be appreciated, the top end cap 127 and the standpipe 52 can be spaced apart in other manners. For example, in a further form, the standpipe 52 is shorter so as to remove the need for the dimpled portion 129 on the top end cap 127. It is envisioned for still yet another embodiment the end of the standpipe 52 contacts the top end cap 127, and the standpipe 52 has one or more side openings that face the filter element 54 (like flow openings 70) near the top of the standpipe 52 so as to provide passageways for air and fuel to the valve 72. In the embodiments described above, pressure regulation and air venting of the filters are both achieved, while conserving space by integrating these features into the standpipe 52.

Figure 8:
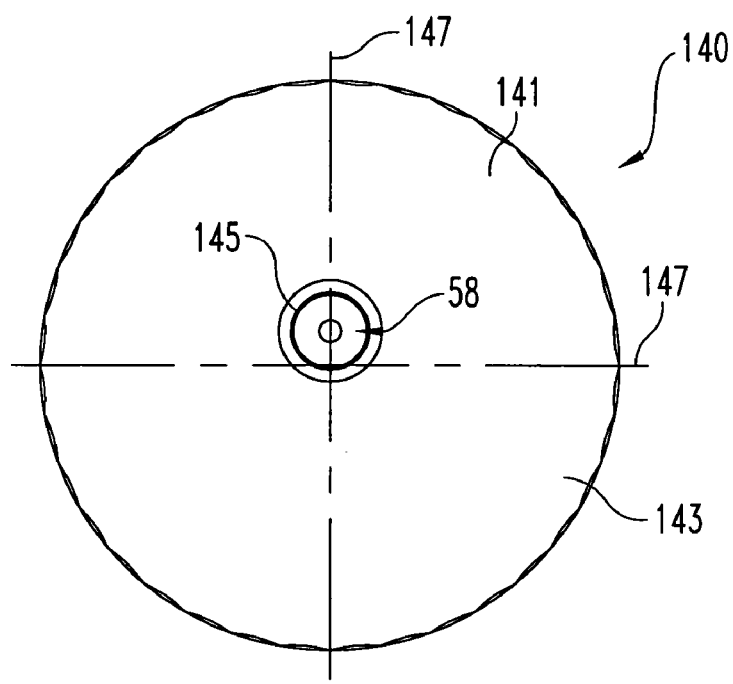
FIG. 8 is a top view of a filter system according to a further embodiment.

A filter system 140 with a filter cartridge 141 according to still yet another embodiment will now be described with reference to FIGS. 8 and 9. The fuel filter system 140 in FIGS. 7 and 9 shares a number of features in common with the filter systems described above, and for the sake of clarity as well as brevity, these common features will not be described again in great detail below. As can be seen by centerlines 147 in FIG. 8, due the position of the drain passage 56, the valve 145 is offset from center. Likewise, the standpipe opening 58 is offset from center. It is contemplated that in other embodiments the valve 145 can be centered on the end cap 143. The filter system 140 has a top end cap or endplate 143 and a pressure regulation valve 145, which have a unique sealing configuration.

Figure 9:
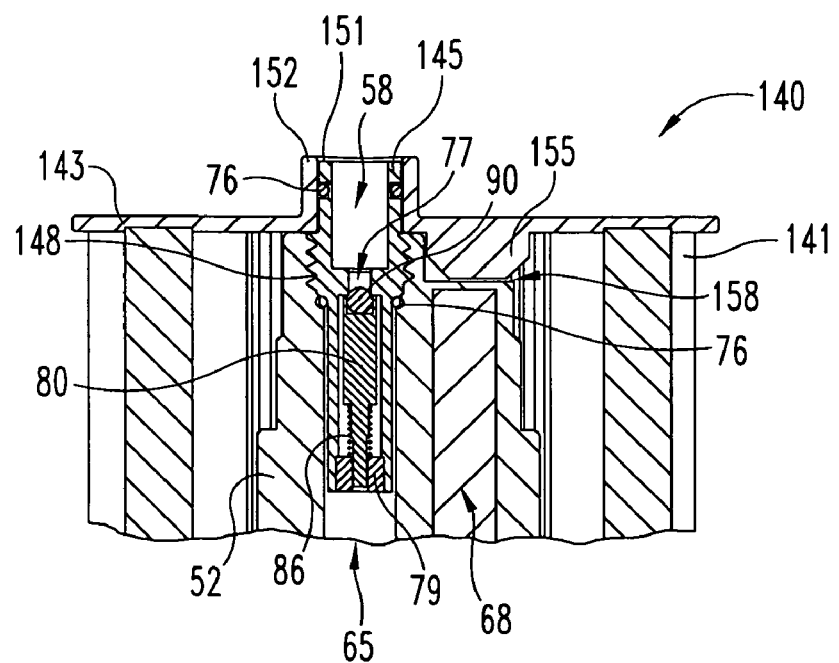
FIG. 9 is a partial cross sectional view of the FIG. 8 filter system.

With reference to FIG. 9, the valve 145 shares a number of components in common with the previously described embodiments, like the valve opening 77, the spring retainer 79, the valve member 80, the spring 86 as well as other components, and the valve 145 operates in a similar fashion as those described previously. In the illustrated embodiment, the valve 145 is secured to the standpipe 52 via threads 148, but it should be recognized that the valve 145 can be secured to the standpipe 52 in other manners. Furthermore, as will be described with reference to FIG. 10, it is envisioned that in other embodiments the valve 145 can be secured to the end cap 143. The valve 145 includes an end cap engagement portion 151 that engages with a valve opening flange 152 that surrounds the standpipe opening 58 in the end cap 143.

As should be recognized, the illustrated system 140 simplifies the sealing arrangement, which in turn provides a number of unique benefits. Between the end cap engagement portion 151 and the valve flange 152, an o-ring 76 seals the valve 145 with the end cap 143. By having the valve 145 seal directly to the end cap 143, a smaller and typically inexpensive seal 76, like the o-ring seal in the illustrated embodiment, can be used, as compared to the arrangement in which the end cap seals to the considerably larger standpipe 52. The smaller seal 76 as well as the offset nature of the standpipe opening 58 allows the end cap 143 to easily float, which can help reduce filter damage during installation. For example, the cap 38 of the filter housing 37 sometimes incorporates clips that clip to the top end cap 143 during installation so that the cap 38 can help pull the used filter cartridge from housing 37 during maintenance. The clips need to be rather rigid so that the clips are strong enough to pull out the filter cartridge out of the housing 37 after prolonged use. During installation of the cap 38 of the filter housing 37, the top end cap needs to move, flex or tilt so that the clips on the cap 38 can slide past the end cap in order to create an interference fit between the clips and the top end cap. In the configuration in which the end cap seals directly to the standpipe, the larger seals tend to immobilize the top end cap, which can create problems during installation of the cap 38 of the filter housing 37. In particular, with the top end cap unable to float or move due to the larger seal, the clips on the cap 38 of the filter housing 37 push against the top end cap, which in turn can crush the filter media 54. In the embodiment of FIGS. 8 and 9, the smaller seal 76 allows the top end cap 143 to tilt or move such that the clips are able to engage the top end cap 143 without damaging the filter media 54.

To aid in the installation and ensure proper sealing, the end cap 143 has an alignment key 155 that engages an alignment slot 158 in the standpipe 52 such that the filter cartridge 141 is properly align with the standpipe 52. In still yet another embodiment, it is contemplated that the filter cartridge can be keyed in an opposite manner; that is, the standpipe 52 has the alignment key 155 and the standpipe 52 has the alignment slot 158. Further, it should be recognized that the alignment or keying structure can be located on or near the top and/or bottom end caps in the cartridge 141, or even disposed in between the end caps. The filter system 141 in FIG. 9 operates in a manner similar to the previously described systems. Like the previous embodiments, the valve 145 relieves pressure and vents air or other gases into the drain passage 65, which in turn drains into the fuel tank.

Figure 10:
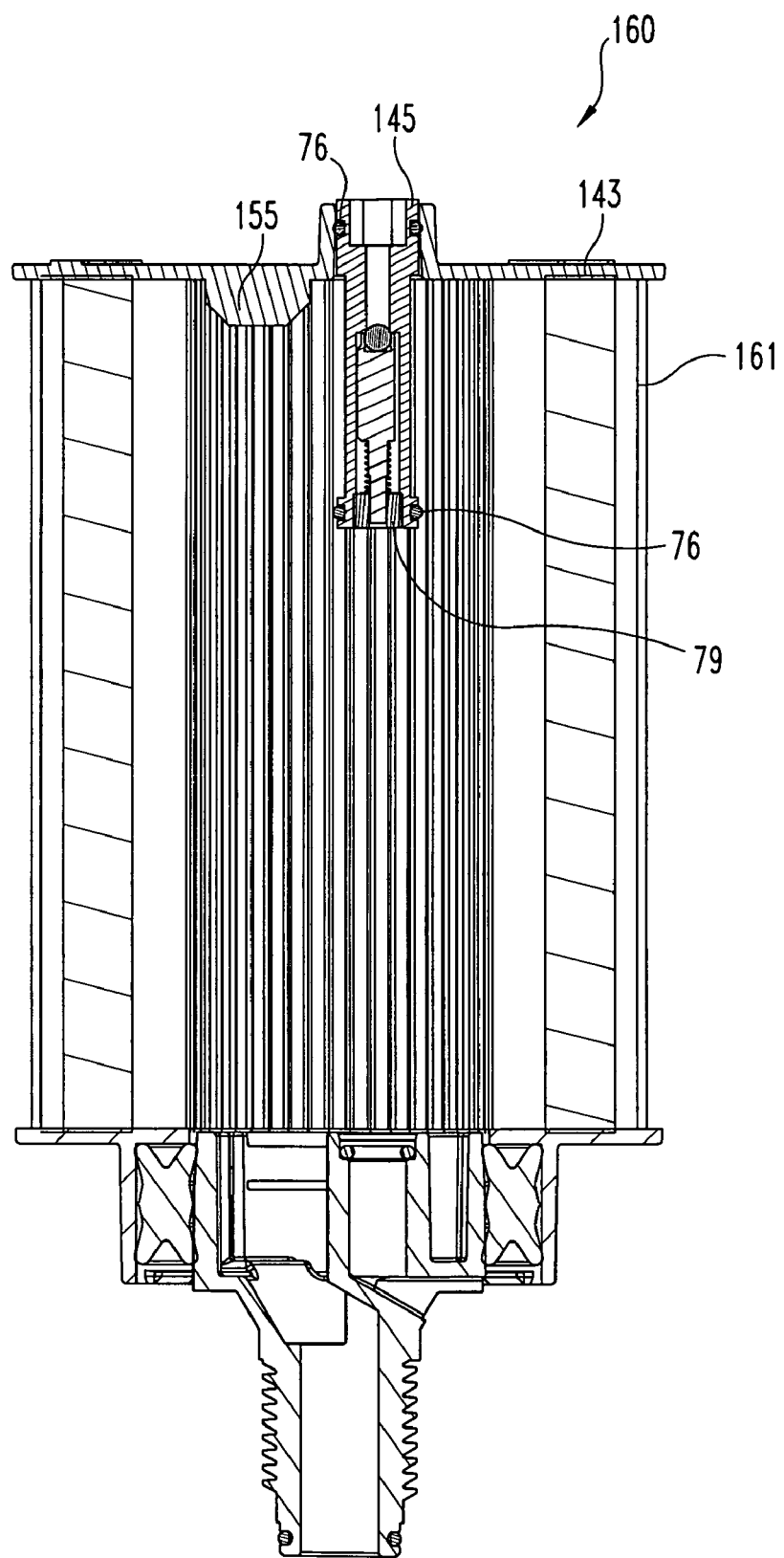
FIG. 10 is a cross sectional view of a filter system according to still yet another embodiment.

A filter system 160 according to still yet another embodiment is illustrated in FIG. 10. As mentioned previously, the filter system 160 has a filter cartridge 161 in which the valve 145 is attached to or integral with the end cap 143. In FIG. 10, the standpipe 52 is not shown so that the interface between the end cap 143 and the valve 145 can be easily viewed, but it should be appreciated that the valve 145 is inserted into the standpipe 52 during installation. In the illustrated embodiment, the o-ring 76 for sealing with the standpipe 52 is positioned at the end of the valve 145, near the spring retainer 79, thereby allowing the standpipe 52 (or a portion thereof) to be shorter, if so desired. In other embodiments, the valve 145 or some extension attached to the valve 143 or the end cap 143 can extend the full length of the filter cartridge 141 so as to define the drain passage 65.

Figure 11:
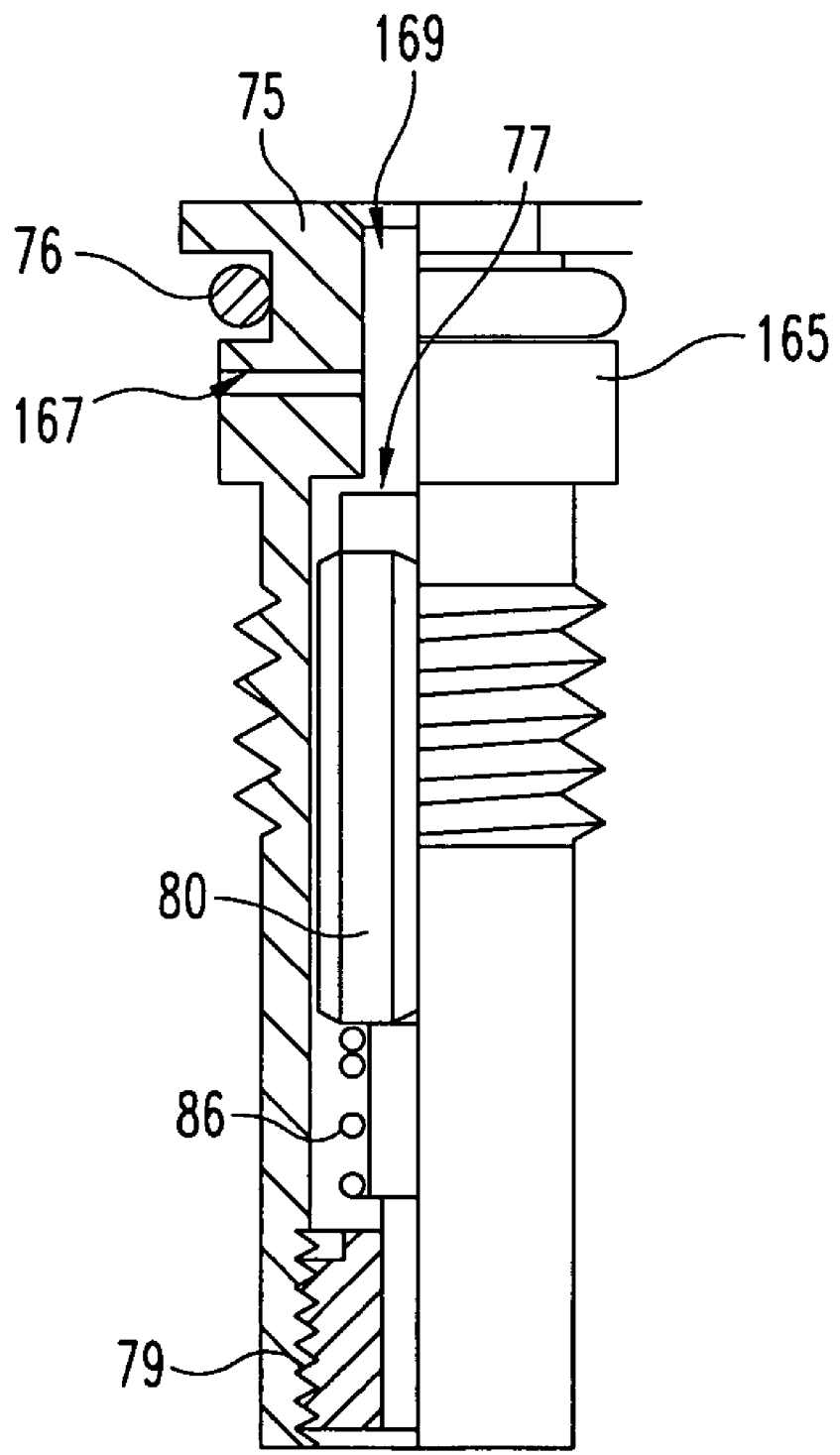
FIG. 11 is a partial, cross sectional view of a valve with a vent orifice according to a further embodiment.

FIG. 11 depicts a valve 165 according to a further embodiment that can be used in the above-discussed filter systems as well as in other embodiments. The valve 165 shares a number of features in common with the previously discussed valves, such as the one illustrated in FIG. 5, and for the sake of brevity and clarity, these common features will not be discussed in great detail below. The one main distinction between the valve 165 depicted in FIG. 11 and the one depicted in FIG. 5 is that a vent passageway or bleed orifice hole 167 is defined in the valve body 75 that allows air to bypass the seal 76 that seals with the standpipe 52. As shown, the vent passageway 167 extends from an inlet port 169 of the valve 165 to the outside of the valve 167. With the vent passageway 167, air or other gases are able to bypass the seal 76 so that they are able to bleed or vent back to the fuel tank via the drain passage 65.

While the invention has been illustrated and described in detail in the drawings and foregoing description, the same is to be considered as illustrative and not restrictive in character. It should be understood that only the preferred embodiments have been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. An apparatus, comprising:
    a housing defining a filter cavity;
    a standpipe extending within the filter cavity, the standpipe defining a filtered fluid flow passage and a drain passage separate from the filtered fluid flow passage;
    a filter disposed around the standpipe in the filter cavity, the filter including a filter cartridge for filtering fluid, wherein the filter cartridge is sandwiched between a top end cap and a bottom end cap, and wherein fluid filtered by the filter cartridge flows through the filtered fluid flow passage;
    the drain passage having an opening proximal the top end cap of the filter; and
    a valve disposed in the opening of the drain passage, wherein the valve is constructed and arranged to vent air or other gases through the drain passage.

2. The apparatus of claim 1, further comprising:
    wherein the top end cap defines a standpipe opening; and
    a seal sealing between the top end cap and the standpipe at the standpipe opening.

3. The apparatus of claim 2, wherein:
    the top end cap has a seal retention flange around the standpipe opening; and
    the seal is a radial type seal that has an outer radial notch that receives the seal retention flange.

4. The apparatus of claim 1, wherein the valve includes a pressure regulation valve that has a cracking pressure to relieve pressure inside the filter cavity by venting the excess pressure through the drain passage.

5. The apparatus of claim 4, wherein the top end cap includes a dimple to form a flow gap between the standpipe and the top end cap.

6. The apparatus of claim 1, wherein the filtered fluid flow passage and drain passage are oriented within the standpipe in a side-by side relationship.

7. The apparatus of claim 1, further comprising:
    an adapter coupling the standpipe to the housing; and
    a double gasket sealing between the adapter, the cartridge, and the housing.

8. The apparatus of claim 7, further comprising a gasket retention flange with a hook that holds the gasket in position.

9. The apparatus of claim 1, wherein the valve includes:
    a valve housing defining a valve opening;
    a stem slidably disposed in the housing;
    a head located at one end of the stem; and
    a spring to bias the valve closed.

10. The apparatus of claim 9, wherein:
    the fluid includes fuel; and
    the drain passage is fluidly coupled to a fuel tank.

11. The apparatus of claim 1, wherein:
    the valve includes a valve housing with a valve inlet port and a seal that seals with the standpipe; and
    the valve housing defines a vent passageway that extends from the valve inlet port to the drain passage at a location that allows the air or other gases to bypass the seal.

12. The apparatus of claim 1, wherein the standpipe and the filter includes an alignment structure to orient the filter cartridge with the standpipe.

13. The apparatus of claim 12, wherein the alignment structure includes a key extending from the top end cap that is received in a slot in the standpipe.

14. The apparatus of claim 1, wherein the valve is secured to the standpipe.

15. The apparatus of claim 1, wherein the valve is secured to the top end cap.

16. The apparatus of claim 1, further comprising a seal that seals between the valve and the top end cap for allowing the top end cap to float.

17. A fuel filter system, comprising:
    a housing defining a filter cavity with a top portion;
    a filter cartridge disposed in the filter cavity, the filter cartridge configured to filter fuel;
    a standpipe extending within the filter cavity, the standpipe defining a filtered fluid flow passage and a drain passage separate from the filtered fluid flow passage, wherein the drain passge comprises an opening at the top portion of the filter cavity and drains to a fuel tank, and wherein fuel filtered by the filter cartridge flows through the filtered fluid flow passage; and
    a pressure regulation valve positioned along the drain passage.

18. The apparatus of claim 17, wherein:
    the filter cartridge includes a filter element with a top end cap that defines a standpipe opening; and
    the standpipe extends through the standpipe opening.

19. The apparatus of claim 17, wherein the top end cap includes a dimple portion that forms a flow gap between the standpipe and the top end cap.

20. An apparatus, comprising:
    a housing defining a filter cavity
    a standpipe extending within the filter cavity, the standpipe comprising a first fluid flow passage and a second fluid flow passage;
    means for filtering fluid disposed in the filter cavity about the standpipe, the first fluid flow passage being in filtered fluid receiving communication with the means for filtering fluid; and
    means for venting air or other gases in the filter cavity coupled to the standpipe, the second fluid flow passage being in vented air or other gases receiving communication with the means for venting air or other gases.

* * * * *